United States Patent Office 3,734,712
Patented May 22, 1973

3,734,712
METHOD FOR CONTROLLING UNWANTED PLANT GROWTH
Adolf Fischer, Mutterstadt, Karl-Heinz Koenig, Ludwigshafen, Gustav Steinbrunn, Schwegenheim, and Albrecht Zschocke, Bad Durkheim, Germany, assignors to Badische Anilin- & Soda-Fabrik Aktiengesellschaft, Ludwigshafen (Rhine), Germany
No Drawing. Continuation-in-part of application Ser. No. 652,034, July 10, 1967, now Patent No. 3,621.055. This application Sept. 11, 1970, Ser. No. 71,356
Claims priority, application Germany, July 19, 1966, P 15 42 834.9; Jan. 17, 1967, P 16 42 217.6
Int. Cl. A01n 9/20
U.S. Cl. 71—120                    2 Claims

ABSTRACT OF THE DISCLOSURE

Method for controlling unwanted plant growth with substituted urea derivatives.

This application is a continuation-in-part of application Ser. No. 652,034, filed July 10, 1967 now U.S. Pat. No. 3,621,055.

The present invention relates methods of controlling undesirable plant growth with urea derivatives, in particular phenylurea derivatives containing carboxy or ester groups.

It is known that trisubstituted ureas, e.g. N-p-chlorophenyl-N'-N'-dimethylurea and N-4 - chlorophenyl-N'-methyl-N'-methoxyurea, may be used as the active ingredients of herbicides. However their action is not satisfactory.

An object of the invention is to provide a method of controlling unwanted plant growth without injuring crop plants and a method for controlling all plants over a specific area with valuable new phenylurea derivatives containing carboxy groups.

These and other objects of the invention are achieved with compounds having the formula

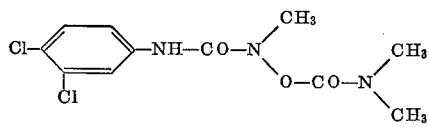

in which X denotes chloro, bromo, fluori, trifluoromethyl or chlorophenoxy, the X radicals being identical or different and $n$ denotes 0, 1, 2 or 3, $R^1$ denotes hydrogen, lower alkyl, allyl, cyclohexyl, or methylcyclohexyl, $R^3$ denotes hydrogen or lower alkyl and $R^4$ denotes hydrogen, lower alkyl, methoxy or isobutinyl.

These compounds have a good herbicidal action on broadleaved and grass weeds, are well tolerated by and have no injurious aftereffect on cereals, Indian corn and rice and have a rapid onset of action.

These compounds are suitable for controlling unwanted plants growing among crops without injuring the crops. Furthermore they have short residual action so that after the crop plants have been harvested new plants can be sown without suffering any injury.

The active ingredients may be prepared by conventional methods by reacting substituted N-phenyl-N'-hydroxyureas with carbamoyl halides in the presence of alkaline reagents; the N-phenyl-N'-hydroxyureas may be prepared for example from the corresponding isocyanates and substituted hydroxylamines. The active ingredients may also be prepared for example by reacting the alkali metal or alkaline earth metal salts of N'-hydroxyurea derivatives with halocarboxylic amides; the N-hydroxyurea derivatives may be prepared for example from the corresponding isocyanates and substituted hydroxylamines.

The following illustates how the new substituted urea derivatives are prepared (parts specified are parts by weight unless otherwise stated).

N - 3,4 - dichlorophenyl-N'-methyl-N'-(dimethylcarbamoyl)-hydroxyurea of the formula

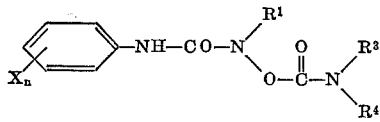

5.4 parts of dimethylcarbamoyl chloride is dripped while stirring at 35° C. into 12 ports of N-3,4-dichlorophenyl-N'-methyl-N'-hydroxyurea dissolved in 75 parts of toluene and 5.2 parts of triethylamine. The reaction mixture is then kept at 60° to 65° C. for some hours. After cooling, the mixture is washed with water, dried and freed of solvent in vacuo. The crystalline residue is recrystallized from toluene. 14 parts of N-3,4-dichlorophenyl - N'-methyl-N'-(dimethylcarbamoyl)-hydroxyurea is obtained with a melting point of 134° to 136° C.; chlorine found: 23.6%, calcd.: 23.2%.

The other active ingredients according to the invention may be prepared by analogous methods. Depending on the acid halide or carbamic halide used, the temperature of the esterification may be between —20° and +100° C., preferably, however, between 0° and 70° C.

The following substituted N'-hydroxyureas are examples of suitable starting materials in the production of the compounds according to the invention:

N-3,4-dichlorophenyl-N'-methyl-N'-hydroxyurea
N-3-chlorophenyl-N'-methyl-N'-hydroxyurea
N-4-chlorophenyl-N'-methyl-N'-hydroxyurea
N-3,4-dichlorophenyl-N'-isopropyl-N'-hydroxyurea
N-3-chlorophenyl-N'-isopropyl-N'-hydroxyurea
N-3-trifluoromethylphenyl-N'-methyl-N'-hydroxyurea
N-3-nitrophenyl-N'-methyl-N'-hydroxyurea
N-phenyl-N'-ethyl-N'-hydroxyurea
N-3-tolyl-N'-methyl-N'-hydroxyurea
N-4-(4'-chlorophenoxy)-phenyl-N'-methyl-N'-hydroxyurea.

The following compounds are suitable halocarboxylic acids or their derivatives for the production of the urea derivatives: α-chloracetic acid, α-bromoacetic acid, α-chloropropionic acid, α-bromopropionic acid, α-chlorobutyric acid, α-bromobutyric acid, α-chloroisobutyric acid, α-bromoisobutyric acid, β-chloropropionic acid, β-bromopropionic acid, α,α-dichloropropionic acid, α,α-dibromopropionic acid, α-chloroacetonitrile, α-bromoacetonitrile, α-chloropropionitrile, α-bromopropionitrile, methyl α-chloroacetate, methyl α-bromoacetate, methyl α-chloropropionate, methyl α-bromopropionate, α-chloroacetamide, α-bromoacetamide, α-chlorodimethylacetamide, α-bromodimethylacetamide, α-chloro-N-methyl-N-isobutynylacetamide and α-bromo - N-methyl-N-isobutynylacetamide.

The following substances are examples of active ingredients according to this invention:

| X | n | R¹ | $-N\begin{smallmatrix}R_3\\R_4\end{smallmatrix}$ | M.P. (° C.) |
|---|---|---|---|---|
| 3-Cl | 1 | —CH₃ | —N(CH₃)₂ | 104–106 |
| 3-CF₃ | 1 | —CH₃ | —N(CH₃)₂ | 90–92 |
| 4-F | 1 | —CH₃ | —N(CH₃)₂ | 98–100 |
| 3-Cl | 1 | —C₆H₁₁ (cyclohexyl) | —N(CH₃)₂ | 90–92 |

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water or by mixing the salts with water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The active ingredients may also be applied as granulates.

The active ingredients may be mixed with insecticides, fungicides, bactericides and other herbicides as well as with fertilizers.

Dusts may be prepared by mixing or grinding the active ingredients with a solid carrier.

The following examples illustrate the application of the active ingredients according to this invention.

EXAMPLE 1

In a greenhouse plastic pots having a diameter of 8 cm. were filled with loamy sandy soil and seeds of cotton (Gossypium spp.), Indian corn (Zea mays), barley (Hordeum vulgare), wheat (Triticum vulgare), wild mustard (Sinapis arvensis), white goosefoot (Chenopodium album), small nettle (Urtica urens), chickweed (Stellaria media), gallant soldier (Galinsoga parviflora), annual meadow grass (Poa annua) and slender foxtail (Alopecurus myosuroides) were sown therein. The soil thus prepared was then treated with N-3,4-dichlorophenyl-N'-methyl-N'-(dimethylcarbamoyl)-hydroxyurea (I) and, for comparison, with N-p-chlorophenyl-N',N'-dimethylurea (II), each at a rate of 3 kg. of active ingredient per hectare dispersed in 500 liters of water. After three to four weeks it was observed that compound I had about as good a herbicidal action as II, but it was better tolerated by cotton, Indian corn, barley and wheat. The results of the experiment can be seen from the following table.

| | Active ingredient | |
|---|---|---|
| | I | II |
| Crop plants: | | |
| Cotton | 0 | 10–20 |
| India corn | 0 | 20 |
| Barley | 10 | 30–40 |
| Wheat | 5 | 40–50 |
| Unwanted plants: | | |
| Wild mustard | 90–100 | 100 |
| White goosefoot | 90–100 | 90–100 |
| Small nettle | 100 | 100 |
| Chickweed | 90–100 | 90–100 |
| Gallant soldier | 90–100 | 90–100 |
| Annual meadow grass | 90 | 90 |
| Slender foxtail | 80–90 | 80–90 |

NOTE: 0=no injury; 100=complete kill.

The following compounds have a biological activity corresponding to that of active ingredient I in Examples 1 and 2:

N-3,4-dichlorophenyl-N'-methyl-N'-(diisopropyl-carbamoyl)-hydroxyurea
N-3-trifluoromethylphenyl-N'-methyl-N'-(methyl-methoxycarbamoyl)-hydroxyurea
N-3,4-dichlorophenyl-N'-methyl-N'-(methyliso-butynylcarbamoyl)-hydroxyurea
N-4-(4'-chlorophenoxy)-phenyl-N'-isopropyl-N'-dimethylcarbamoyl)-hydroxyurea

EXAMPLE 2

In a greenhous the plants Indian corn (Zea mays), barley (Hordenum vulgare), wheat (Triticum vulgare), rye (Secale cereale), wild mustard (Sinapis arvensis), white goosefoot (Chenopodium album), small nettle (Urtica urens), bur marigold (Bidens pilosa), summer cypress (Kochia scoparia), wild oats (Avena fatua), annual meadow grass (Poa annua) and slender foxtail (Alopecurus mysosuroides) were treated at a growth height of 4 to 17 cm. with N-3,4-dichlorophenyl-N'-methyl-N'-(dimethylcarbamoyl)-hydroxyurea (I) and, for comparison, with N-p-chlorophenyl-N',N'-dimethylurea (II), each at a rate of 3 kg. of active ingredient per hectare dispersed in 500 liters of water. After three to four weeks it was observed that compound I had a stronger herbicidal action than II and was better tolerated by Indian corn, barley, wheat and rye. The results of the experiment can be seen from the following table.

| | Active ingredient | |
|---|---|---|
| | I | II |
| Crop plants: | | |
| Indian corn | 10 | 20–30 |
| Barley | 10 | 70 |
| Wheat | 0 | 90 |
| Rye | 10 | 80 |
| Unwanted plants: | | |
| Wild mustard | 100 | 100 |
| White goosefoot | 100 | 90–100 |
| Small nettle | 100 | 100 |
| Bur marigold | 90–100 | 90 |
| Summer cypress | 100 | 80 |
| Wild oats | 90–100 | 80 |
| Annual meadow grass | 90–100 | 80–90 |
| Slender foxtail | 90–100 | 80–90 |

NOTE: 0=no injury; 100=complete kill.

EXAMPLE 3

An experimental plot was sown with wild mustard (Sinapis arvensis), white goosefoot (Chenopodium album), small nettle (Urtica urens), chickweed (Stellaria media), gallant soldier (Galinsoga parviflora), annual meadow grass (Poa annua) and slender foxtail (Alopecurus myosuroides) and sprayed on the day of sowing with N - 3,4-dichlorophenyl-N'-methyl-N'-(dimethylcarbamoyl)-hydroxyurea (I) and, for comparison, with N-p-chlorophenyl-N',N'-dimethylurea (II), each at a rate of 5 kg. of active ingredient per hectare dispersed in 500 liters of water. During the emergence of the broad-leaved and grass weeds it was observed that after two weeks active ingredient I had killed the broadleaved and grass weeds, whereas in the case of active ingredient II it was four to five weeks before they completely withered.

The following compounds have a biological action corresponding to that of active ingredient I in Example 3:

N-phenyl-N'-2-methylcyclohexyl-N'-(dimethylcarbamoyl)-hydroxyurea

N-3-chloro-4-bromophenyl-N'-cyclohexyl-N'-(dimethylcarbamoyl)-hydroxyurea

N-e-chloro-4-bromophenyl-N'-cyclohexyl-N'-(dimethylcarbamoyl)-hydroxyurea

N-3,4-dichlorophenyl-N'-allyl-N'-(dimethylcarbamoyl)-hydroxyurea

We claim:

1. A method for controlling unwanted plant growth wherein the plants are treated with a phytotoxic amount of N - 3,4 - dichlorophenyl - N'-methyl-N'-(dimethylcarbamoyl)-hydroxyurea.

2. A method for controlling unwanted plant growth wherein the host soil in which the plant growth is to be prevented is treated with a phytotoxic amount of N-3,4-dichlorophenyl - N' - methyl-N'-(dimethylcarbamoyl)-hydroxyurea.

References Cited

UNITED STATES PATENTS

| 3,424,571 | 1/1969 | Bondouy | 71—120 |
| 3,621,055 | 7/1967 | Fischer et al. | 71—120 |
| 3,637,795 | 1/1972 | Krenzer et al. | 71—120 X |
| 3,641,143 | 2/1972 | Richter et al. | 71—120 X |

FOREIGN PATENTS

| 1,204,879 | 11/1965 | Germany | 71—120 |

JAMES O. THOMAS, Jr., Primary Examiner